United States Patent [19]

Pratt

[11] Patent Number: 4,865,416
[45] Date of Patent: Sep. 12, 1989

[54] OPTICAL SENSING ARRANGEMENTS

[75] Inventor: David J. Pratt, West Yorkshire, England

[73] Assignee: Plessey Overseas Limited, Ilford, England

[21] Appl. No.: 90,863

[22] Filed: Aug. 28, 1987

[51] Int. Cl.$^4$ .............................................. B01N 21/17
[52] U.S. Cl. .................................... 350/96.29; 356/72; 356/73
[58] Field of Search ............................ 350/96.29, 96.34; 250/227, 231 R; 73/800; 356/72, 73, 73.1, 44

[56] References Cited

U.S. PATENT DOCUMENTS

| | | | |
|---|---|---|---|
| 4,319,186 | 3/1982 | Kingsley | 350/96.29 X |
| 4,362,057 | 12/1982 | Gottlieb et al. | 356/44 X |
| 4,459,477 | 7/1984 | Asawa et al. | 350/96.15 X |
| 4,525,818 | 6/1985 | Cielo et al. | 356/44 X |
| 4,560,248 | 12/1985 | Cramp et al. | 350/96.29 X |
| 4,581,530 | 4/1986 | Brogardh et al. | 350/96.29 X |
| 4,648,082 | 3/1987 | Savit | 350/96.29 X |
| 4,654,520 | 3/1987 | Griffiths | 350/96.29 X |
| 4,749,254 | 6/1988 | Seaver | 350/96.29 |
| 4,794,619 | 12/1988 | Tregay | 350/96.29 X |

OTHER PUBLICATIONS

Davis, "Fiber optic sensors: an overview", *Optical Engineering*, Mar./Apr. 1985, vol. 24, No. 2, pp. 347–351.

*Primary Examiner*—John D. Lee
*Attorney, Agent, or Firm*—Fleit, Jacobson, Cohn, Price, Holman & Stern

[57] ABSTRACT

An optical sensing arrangement in which optical signals are transmitted along a plurality of discrete optical fibre paths of different lengths which are terminated in respective sensors adapted for sensing temperature, pressure or any other condition to be sensed at appropriate locations and in which optical signals reflected or otherwise caused to be transmitted back along the optical fibres of different lengths in response to the transmission of the optical signals along said fibres and in accordance with variations in conditions at the aforesaid locations are detected by optical time domain or frequency domain reflectometer means for determining the conditions at the sensor locations.

1 Claim, 1 Drawing Sheet

OPTICAL SENSING ARRANGEMENTS

This invention relates to optical sensing arrangements and relates more specifically to such sensing arrangements of the kind in which optical signals are transmitted to appropriately located sensors over optical fibre transmission paths.

Optical sensing arrangements of the kind referred to may employ an optical fibre sensor which extends through various locations where variations in temperature, pressure or some other condition are required to be sensed. Monitoring of such variations in these conditions at distributed points along the optical fibre sensor may then be achieved by utilising so-called optical time domain reflectometry techniques whereby a small proportion of optical signals transmitted along the optical fibre sensor is reflected back along the sensor fibre (i.e. back-scattered light) and detected by detector means which measures the intensity and/or modulation of the reflected signals with respect to time for determining the conditions at the respective monitoring points along the optical fibre sensor. In some applications, however, it may be inconvenient for the sensing optical fibre to pass through all of the monitoring or measuring locations and additionally the technique provides relatively low sensitivity due to the rather poor sensing properties of the optical fibre sensor.

According to the present invention there is provided an optical sensing arrangement of the kind hereinbefore described, in which optical signals are transmitted along a plurality of discrete optical fibre paths of different lengths which are terminated in respective sensors adapted for sensing temperature, pressure or any other condition to be sensed at appropriate locations and in which optical signals reflected or otherwise caused to be transmitted back along the optical fibres of different lengths in response to the transmission of the optical signals along the said fibres and in accordance with variations in conditions at the aforesaid locations are detected by optical time domain or frequency domain reflectometer means for determining the conditions at the sensor locations.

In carrying out the present invention the optical signals transmitted along the discrete optical fibres of different lengths may be derived from a single optical signal produced by an optical source (e.g. semiconductor laser) and fed for example along a single optical fibre into a multi-output optical fibre coupler which serves to divide the single optical signal into a plurality of like output signals which are then transmitted down the discrete optical fibres of different lengths to the respective sensors.

The sensors terminating the discrete optical fibres of different lengths may themselves comprise optical fibre sensors which may, for example, be suitably doped with light-absorbent or fluorescent material whereby the level of time-displaced back-scattered light or the level of time-displaced fluorescent light emitted by the optical fibre sensors and returned back down the fibre and which can be determined by the optical time domain or frequency domain reflectometer means may, for example, be representative of the temperatures of the respective sensors.

As will be appreciated, the sensors may take many different forms according to requirements. For instance, they may comprise measurand-dependent reflectors or measurand-dependent absorbers with associated reflectors or they may be chemical sensors arranged to respond to the spectometric properties of the reactive constitutents of a reation or of chemical material which interacts chemically with a reactance to be monitored.

For the purpose of compensating for unknown losses produced in the sensing arrangement dual or multiple wavelength referencing may be employed whereby signals of different wavelengths are transmitted down the discrete optical fibres to the respective sensors and then, for example, reflected back along the fibres to the optical time domain reflectometer means which may include filter means for filtering out the component wavelengths for comparison purposes and consequential measurement of the conditions being sensed.

By way of example the present invention will now be described with reference to the accompanying drawing in which:

FIG. 2 shows one form of sensor for use in the arrangement of FIG. 1: and.

Figure 1:
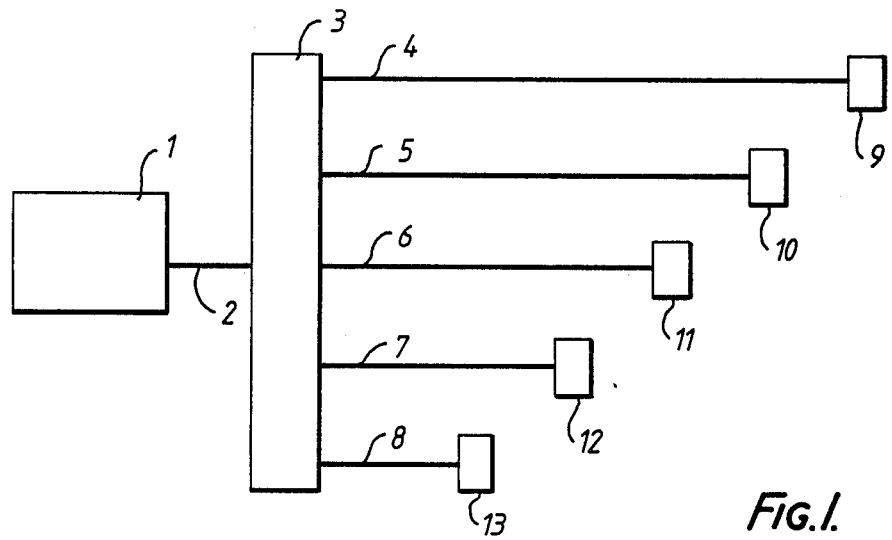
FIG. 1 shows a block schematic diagram of an optical sensing arrangement according to the present invention.

Referring to FIG. 1 of the drawing a combined light source (e.g. semiconductor laser) and optical time domain reflectometer detector 1 is connected by means of an optical fibre 2 to the input of a multi-output optical fibre coupler 3 which may comprise star and/or Y and-/or X couplers. The outputs from the multi-outlet coupler (i.e. five in the present example) are launched into discrete optical fibres 4, 5, 6, 7, and 8 which are of different lengths. These optical fibres are terminated, respectively, by sensors 9, 10, 11, 12 and 13 which, as previously mentioned may be one of many different types according to the specific monitoring requirements.

In operation of the optical sensing arrangement shown the optical source 1 launches an optical signal (i.e. a single pulse or plurality of pulses) into the optical fibre 2. When the signal reaches the multi-output optical fibre coupler 3 the signal is split equally between the five outputs of the coupler. Since the optial fibres 4 to 8 are of differet lengths the times taken for their respective optical signals to reach the sensors 9 to 13 will vary from one optical fibre path to another.

Figure 2:
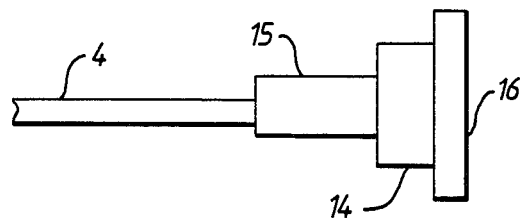

Assuming that the sensors 9 to 13 are of the exemplary form shown in FIG. 2 where the sensor comprises measurand-dependent absorbent material 14 and an associated collimating lens 15 and reflector 16 the optical signals reaching the sensors will be reflected back down the respective fibres 4 to 8 after passing through the light absorbent material 14. The returned light is accordingly modulated in its amplitude or spectral properties in dependence upon the conditions being sensed by the sensors and the consequential variations in the light absorbed by the absorbent material. The reflected light signals which will be time displaced relative to one another due to the different optical fibre path lengths will then be detected and measured by the optical time domain reflectometer means 1 with the identities of the sensors being indicated by the time intervals between the initial transmission of the optical signal by the source 1 and reception of the reflected optical signals by the reflectometer.

Figure 3:
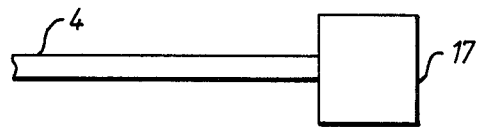
FIG. 3 shows another form of sensor for use in the arrangement of FIG. 1.

The sensors 9 to 13 may, alternatively, be of the form shown in FIG. 3 incorporating a measurand-dependent reflector 17.

In order to eliminate the effects of coupler efficiency variations and undetermined fibre losses two-wavelength or multiple-wavelength detector arrangements may be used in which optical signals of two or more different wavelengths are transmitted to the sensors. In this way the return signal of one wavelength can be used to define an intensity reference for the signal at the second or another wavelength.

As will be appreciated from the foregoing description the present invention enables a multiplicity of optical sensors to be monitored using a single measuring instrument. Moreover, the provision of discrete optical fibres of different lengths avoids the need for a single fibre having sensors distributed therealong to pass through all of the points to be monitored. Additionally, the sensors used may be extrinsic/reflective sensors which are generally more versatile and frequently of lower cost than intrinsic sensors.

I claim:

1. An optical sensing arrangement in which two discrete optical signals of different wavelengths are transmitted simultaneously along each of a plurality of discrete optical fibre paths of different lengths which are terminated in respective sensors adapted for sensing conditions such as temperature and pressure at appropriate locations and optical time domain reflectometer means for detecting discrete optical signals of different wavelengths reflected back along each of the optical fibres of different lengths in response to the transmission of the aforesaid discrete optical signals of different wavelengths along each of said fibres in accordance with variations in conditions at the aforesaid locations, said optical time domain reflectometer means including filter means for filtering out the different wavelengths of the reflected optical signals in each of the optical fibres to enable one of the reflected optical signals at one wavelength to be used as an intensity reference for the reflected signal at the other wavelength and consequential measurement of the conditions being sensed.

* * * * *